Nov. 18, 1924.　　　　　　　　　　　　　　　　　1,515,988
J. R. ARMSTRONG ET AL
INTEGRATING AND REGISTERING DEVICE FOR FLUID METERS
Filed April 14, 1921　　　6 Sheets-Sheet 1

GAS FLOW.

INVENTORS.
J. R. Armstrong
BY R. B. Wylie
ATTORNEY.

Nov. 18, 1924.  
J. R. ARMSTRONG ET AL  
1,515,988  
INTEGRATING AND REGISTERING DEVICE FOR FLUID METERS  
Filed April 14, 1921  
6 Sheets-Sheet 2
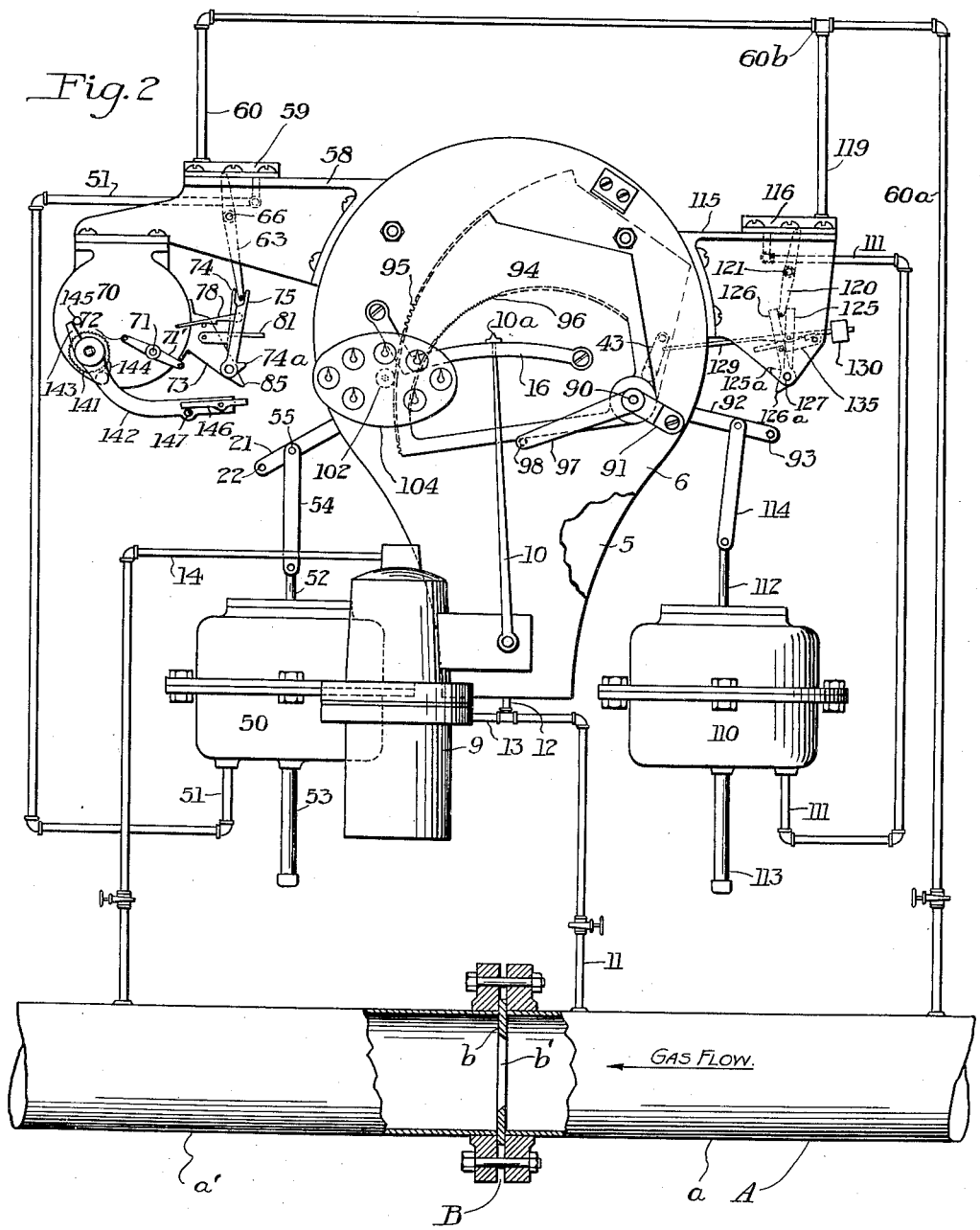

Nov. 18, 1924.

J. R. ARMSTRONG ET AL 1,515,988

INTEGRATING AND REGISTERING DEVICE FOR FLUID METERS

Filed April 14 1921    6 Sheets-Sheet 3

INVENTORS
J. R. Armstrong
BY
ATTORNEY

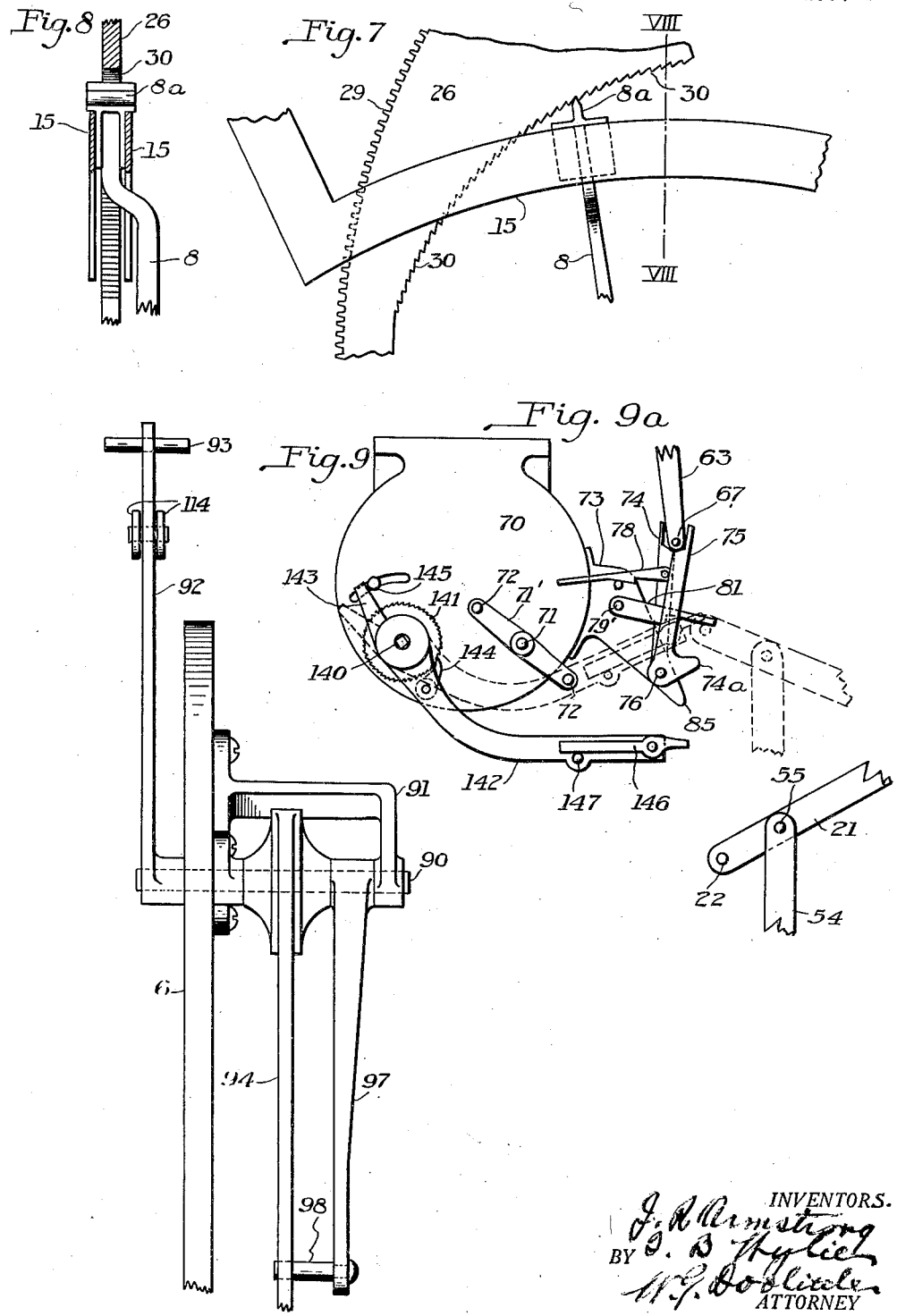

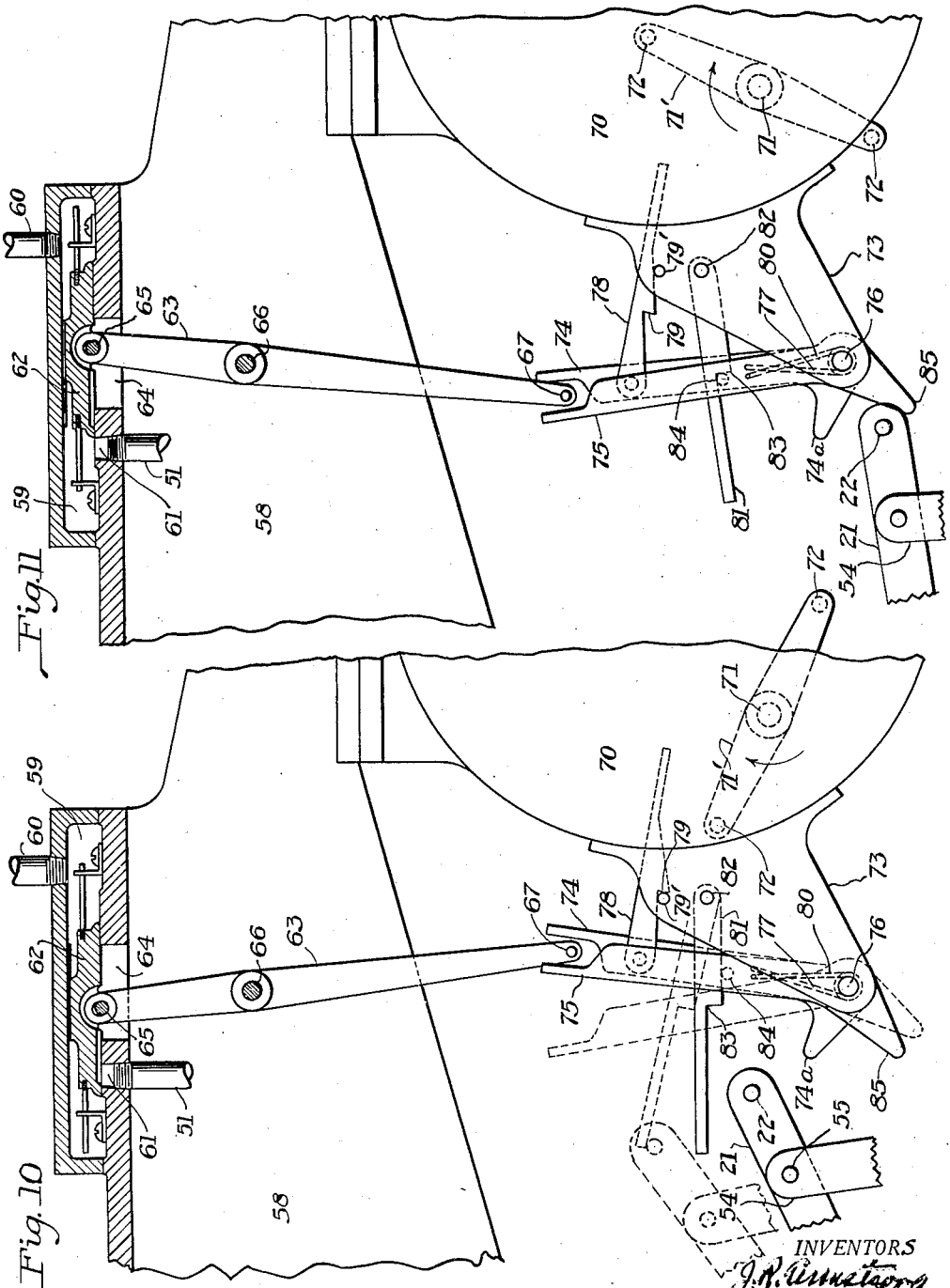

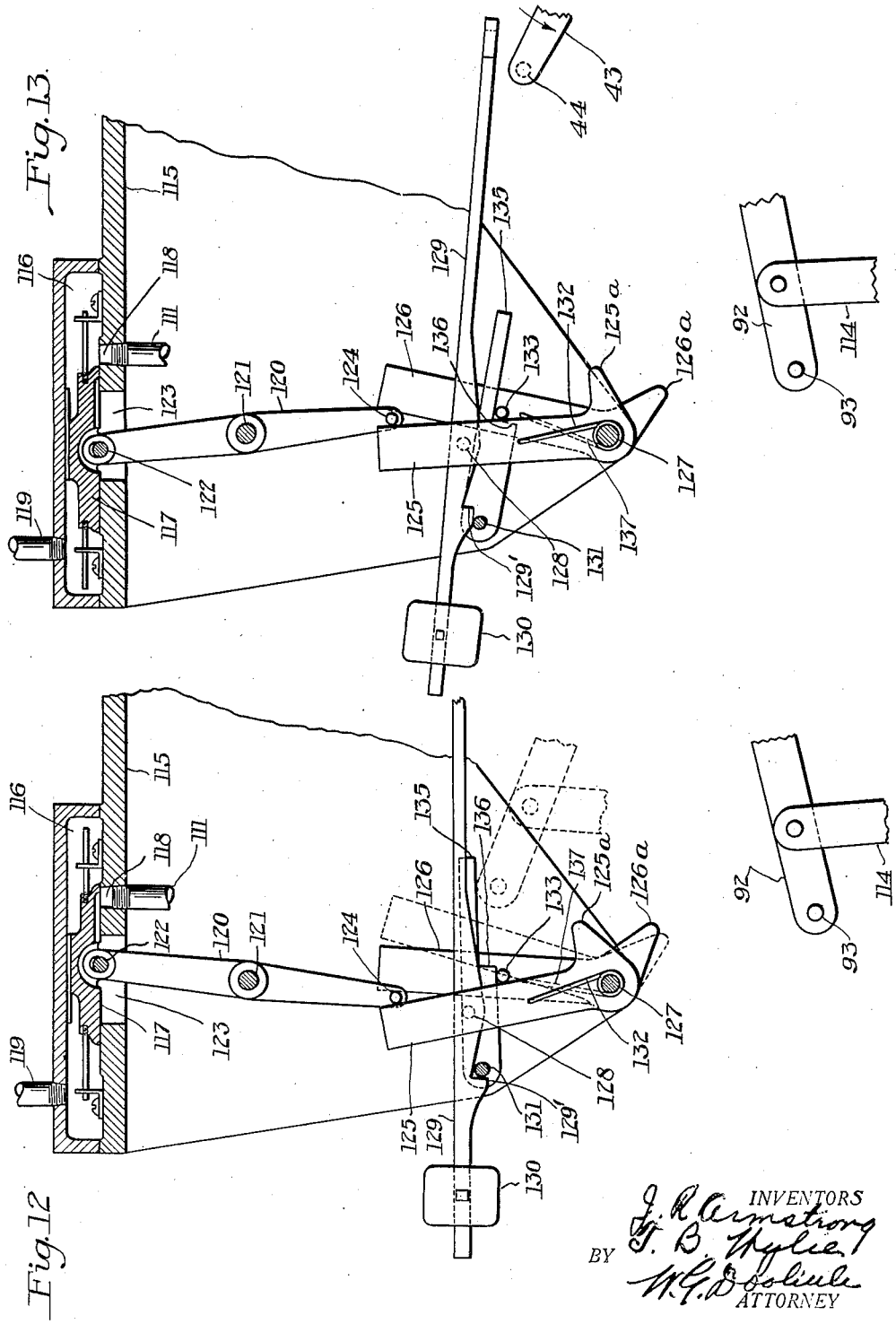

Patented Nov. 18, 1924.

1,515,988

UNITED STATES PATENT OFFICE.

JAMES R. ARMSTRONG, OF PITTSBURGH, AND THOMAS B. WYLIE, OF BELLEVUE, PENNSYLVANIA.

INTEGRATING AND REGISTERING DEVICE FOR FLUID METERS.

Application filed April 14, 1921. Serial No. 461,459.

*To all whom it may concern:*

Be it known that we, JAMES R. ARMSTRONG and THOMAS B. WYLIE, citizens of the United States, residing at Pittsburgh and Bellevue, respectively, in the county of Allegheny and State of Pennsylvania, have invented certain new and useful Improvements in Integrating and Registering Devices for Fluid Meters, of which the following is a specification.

This invention is for an integrating and registering device for fluid meters, which device is designed to automatically register the volume of a fluid passing through a pipe in units of a constant value irrespective of variations and fluctuations in the pressure and velocity of the fluid, and relates particularly to a device for use in connection with orifice meters, Pitot meters, and others.

It is a well known fact that the density of a gas increases with the pressure and that a given volume of gas at two atmospheric pressures will be double the amount at a single atmosphere. In our co-pending application Serial No. 461,458, filed April 14, 1921, we have described a device for measuring the quantity of gas at a given pressure, i. e., the pressure at which it is to be used or sold, irrespective of the pressure in the pipe line. In the said application, the gas passes through an ordinary metering device, which metering device controls the operation of gearing, the actuation of which gearing is, in turn, limited by a pressure controlled means. The gearing is connected with a registering device, and the amount registered thereby is therefore proportioned to the volume and pressure, and the gas can be measured in terms of a unit of constant value.

Certain heated or corrosive gases cannot readily be passed through a volume registering meter without injury to the meter, and it is desirous in such cases, and also in other cases, as in gas lines, to measure the volume of gas by the use of an orifice meter.

Orifice meters are well known in the art, and comprise merely a plate inserted in the pipe line, which plate has an orifice or opening therein of known size. It is known that a certain amount of gas at a given pressure will pass through the orifice in a given time, and that the volume passed through will increase with the pressure. It is therefore possible to determine the amount of gas passing through the orifice meter in a given time, if the average static pressure in the line for the same time is known and the differential pressure between the upstream and downstream side is known, the formula being $$Q = C\sqrt{hp}$$

In the formula, Q is the quantity in terms of units at which the fluid is to be measured and used; C, the co-efficient of the orifice; h, the differential pressure in inches of water; and p, the static pressure in pounds or atmospheres. Where a Pitot tube is used as a meter, the dynamic pressure is indicated by h, but the equation remains the same, the constant C then being the co-efficient of the pipe line.

Heretofore, in using orifice meters, it has been the usual practice to chart, by means of recording gauges, the differential or dynamic pressure and the static pressure for a given time, as twenty-four hours, and from these charts the average static and differential pressures for that period could be obtained. Knowing the value of the constant C, the average quantity of gas in units of a desired constant value could be calculated from the above formula. In similar manner, the quantity of gas passing through the pipe every five minutes can be determined, if the value of C for a period of five minutes is known and the average static and differential pressures for the five minutes is known. In practice, the value of C is usually furnished by the manufacturer of the orifice meter.

According to the present invention, we provide two separate trains of gearing, each operated from a meter. The actuation of the motor for the first train of gearing is controlled by clockwork, and the operation of the gears is limited by a static pressure controlled means. This first train of gearing drives a tripping mechanism adapted to effect the operation of the motor for driving the second train of gearing. The arrangement is such that the higher the static pressure, the more frequent is the operation of the motor for driving the second train of gears.

By this arrangement, the motor for driving the second train of gears may be actuated several times to each operation of the first motor, the number of times the second motor operates being proportional to the static pressure. The movement of the second train of gears, which drives a registering device adapted to register in units of the desired value, is limited by differential or dynamic pressure actuated means, so that the amount registered by the registering device with each actuation of the second motor is proportional to the differential pressure. The number of teeth in each train of gears is accurately figured so that the amount registered will be correct, the second train of gearing including gears which correspond to the value of the constant of the orifice meter. In other words, when the orifice meter has a large opening, the registering device must be driven to indicate a greater quantity with each operation of the second motor than when an orifice meter having a small co-efficient is used, and the gearing in the second train is therefore made properly proportionate to the constant of the orifice meter with which our invention is to be used. Thus, we have provided a registering device adapted to be used in connection with orifice meters which will register the quantity of gas actually passing through the meter in units of a constant known and desired value, irrespective of the variations in line pressure and without necessitating the use of recording charts and mental calculations for determining this result.

Our invention may be more readily understood by reference to the accompanying drawings which show one form of apparatus embodying our invention, in which, Fig. 1 is a rear elevational view of an apparatus embodying our invention;

Fig. 2 is a front elevation thereof;

Fig. 7 is an elevational view on a larger scale of a portion of the mechanism shown in Fig. 4, and showing a gauge actuated stop for limiting the movement of the arm;

Fig. 8 is a section on line VIII—VIII of Fig. 7;

Fig. 9 is a view similar to Fig. 4, showing the arm actuated by the second motor;

Fig. 9$^a$ shows in detail a front elevation of one form of an automatic clock winding mechanism which we may employ;

Fig. 10 is a side elevation on a large scale of the mechanism for controlling the actuation of the first motor, the controlling valve being shown in section and in closed position;

Fig. 11 is a similar view showing the valve open to effect actuation of the motor;

Fig. 12 is a similar view of the valve and mechanism for controlling the second motor, showing the valve closed;

Fig. 13 is a similar view with the valve open.

Figure 1:
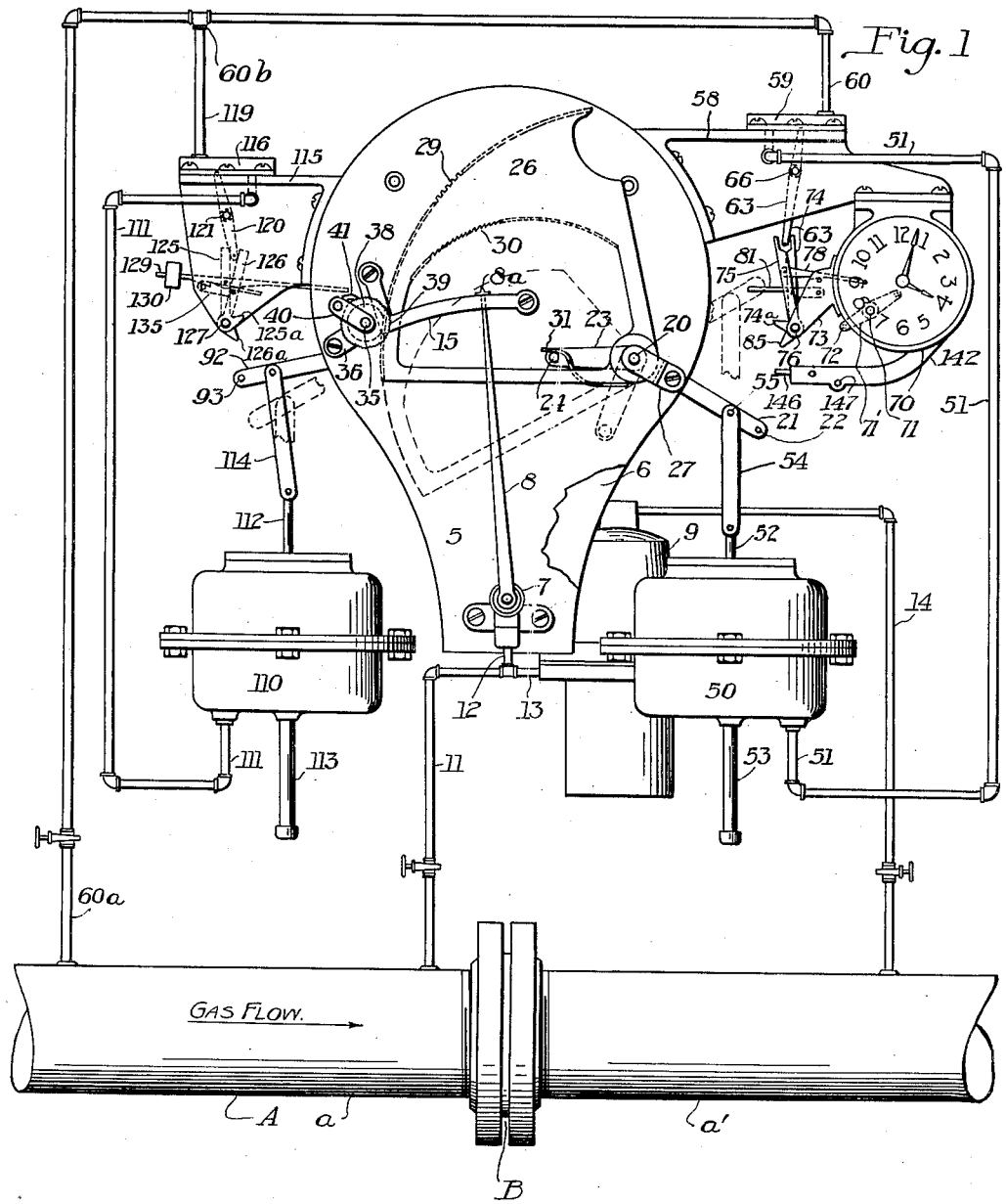

Referring to Figs. 1 and 2 of the drawings, A indicates a pipe line having an orifice meter disposed therein at B. The upstream side of the pipe is indicated by $a$ and the downstream side by $a'$. The orifice meter, shown in Fig. 2, comprises a plate $b$ having an orifice or aperture $b'$ therein.

The device, as shown in the accompanying drawings, comprises two spaced apart plates 5 and 6, the broken away portion of Fig. 2 showing one plate disposed in the rear of the other. These plates form a supporting structure and any suitable means could be used in their place.

Mounted at the bottom of plate 5 is a static pressure gauge 7 having an indicator arm 8. Mounted at the bottom of plate 6 is a differential gauge 9 having an indicator arm 10. A pipe 11, leading from the upstream side of the orifice meter B, communicates the pressure on the upstream side of the line to the static pressure gauge through branch pipe 12 and to one part of the differential gauge through branch 13. It is not necessary, however, that the static pressure be taken from the upstream side of the line, as it may be taken from any suitable point in the line. The downstream side of the differential pressure gauge communicates through pipe 14 to the downstream side of the pipe $a'$. The static and differential pressure gauges are of any preferred known or suitable construction, the static pressure gauge responding to absolute pressure in the line, and the differential gauge being responsive to differences in pressure on each side of the orifice.

The difference in pressure on the two sides of the orifice increases in proportion to the increase in the velocity of gas passing through the orifice. The pressure gauge is preferably so constructed as to indicate zero pressure at an absolute pipe line pressure of one atmosphere. In special applications where gases below atmospheric pressure are to be measured, specially designed gauges would be used.

The indicator arm 8 of the static pressure gauge is guided between parallel segmental strips 15, as shown in Fig. 8, secured to plate 5 and on the top of the indicator arm is a stop member 8$^a$. The indicator arm 10 is similarly guided in strips 16 and has a similar stop 10$^a$ at its upper end. The stops 8$^a$ and 10$^a$ are slid along the tops of strips 15 and 16 respectively, by their respective indicator arms, but the strips serve to prevent downward pressure applied to the stops being transmitted to the indicator arms.

Figure 4:
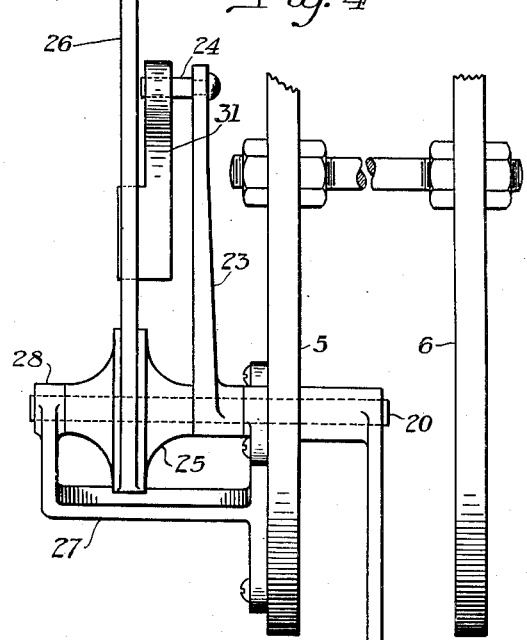
Fig. 4 is a plan view showing a motor actuated arm for transmitting motion from the motor to the gearing, Fig. 4 showing the arm actuated by the first motor.

Journalled at one side of plate 5, as indicated in Fig. 4, is a shaft 20 which passes through the plate 5 and projects from each face thereof. On the end of shaft 20 between plates 5 and 6 is keyed an arm 21 which projects laterally from between the plates. Near the end of arm 21 is a fixed transverse pin 22. Keyed or fixed to the end of the shaft 20 is a lateral arm 23 extending in a direction opposite the arm 21. Near the end of arm 23 is a pin 24. Loose on shaft 20 is a bushing or sleeve 25 which carries a frame 26. A bracket 27 secured to plate 5 provides a journal for shaft 20 at 28.

The frame 26 may oscillate about shaft 20 as its axis. It extends the greater portion of the distance across the plate 5 and is parallel therewith. On the side of the frame most remote from shaft 20 is a segmental rack 29 having gear teeth therein, the axis of the segment being the axis of rotation of the frame. Within the frame is a serrated curved member 30, the curve of which is plotted to bear a certain relation to the guide strips 15 for the indicator arm 8 and to the segmental rack 29. The relation of the frame 26 to the guide 15 and the detailed construction of the frame is clearly shown in Figs. 1, 7 and 8. As shown in Figs. 1 and 4, the frame 26 has a member 31 thereon extending over pin 24 on arm 23, so that upward movement of arm 23 lifts the frame 26, causing it to oscillate about shaft 20. When the arm 23 moves downwardly, the frame 26 may, by gravity, also move downwardly, but its downward movement will be limited by stop 8ª on indicator 8 of the static pressure gauge when the curved serrated portion 30 contacts with the stop. Such limiting of the downward movement of frame 26 does not, however, prevent the further downward movement of arm 23.

From the foregoing it will be seen that the oscillation of frame 26 is limited proportionately to the position of stop 8ª on the pressure gauge indicator 8. As the indicator 8 is adapted to move toward the right in Fig. 1, with an increase in pressure, it can be readily seen that the movement of the frame increases as the pressure increases. In the apparatus shown, it is desired that when the indicator is at the left to the limit of its movement, it will be at its zero position. It will move to this position when the pressure in the line is at atmospheric pressure, that is, zero pressure on the indicator will actually be one atmosphere absolute pressure.

Figure 3:
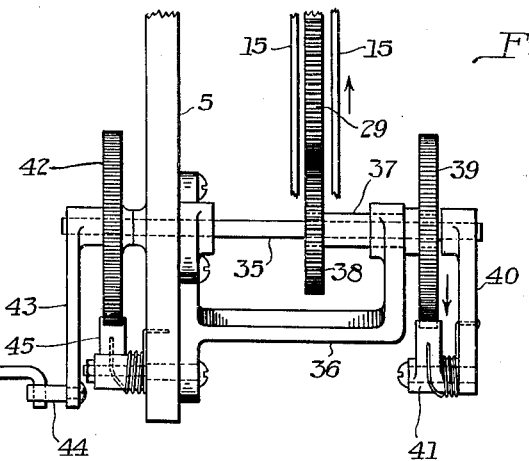
Fig. 3 is a detail view from one end of the machine showing the tripping device for controlling the second motor and the gearing for operating the tripper.

Journalled in the plate 5 and passing therethrough is a shaft 35 which is opposite shaft 20. A bracket 36 secured to the outer face of plate 5 forms a journal for one of the projecting ends of the shaft (see Fig. 3). On the outer portion of shaft 35 and passing through the journal formed by bracket 36 is a sleeve 37 rotatable about shaft 35. Secured to this sleeve is a gear wheel 38 which meshes with the segmental rack 29 on frame 26. On the outer end of the sleeve 37 is fixed a ratchet wheel 39. Fixed to the outer end of shaft 35 is an arm 40 having a small spring pressed pawl 41 thereon adapted to engage the ratchet. The arrangement is such that the pawl and ratchet will act to rotate shaft 35 in the direction of one of the arrows shown in Fig. 3 when the segment 29 is moved upwardly, which is the direction of another one of the arrows in Fig. 3, but will permit the ratchet wheel pawl 39 and gear wheel 38 to rotate without rotating shaft 35 when the segment is rocked downwardly.

Fixed to the inner end of shaft 35 between plates 5 and 6 is a ratchet wheel 42 and an arm 43 having a transverse trip pin 44. A pawl 45 is secured to plate 5 and engages ratchet 42 to prevent rotation of the shaft 35 when the gear wheel 38 and sleeve 37 are rotating idly, but permits rotation of the shaft in the direction of one of the arrows in Fig. 3.

The purpose of the trip arm 43 will be hereinafter more fully described. It may be stated, however, that the gearing is such that the number of revolutions of shaft 35 and trip arm 43 will always be the square root of the number of atmospheres above absolute pressure. If the indicator 8 and stop 8ª are positioned at zero, which, as heretofore explained, is one atmosphere above absolute pressure and equal to atmospheric pressure, the frame 26 may be swung downwardly so that upon its upward movement, shaft 35 will make one complete revolution, the square root of one being one. If the static pressure is forty-five pounds (gauge pressure), approximately sixty pounds or four atmosphere absolute pressure (assuming 15 pounds to equal one atmosphere), the stop 8ª will be so positioned that the frame 26 may rock sufficiently far downward before curved portion 30 contacts therewith to rotate shaft 35 two complete revolutions upon its being raised to normal position, two being the square root of four. The serrations in the curved member 30 prevent the curved portion from moving the indicator stop 8ª when it contacts therewith.

For rocking the frame 26 to rotate the shaft 35, I provide any suitable motor, such, for instance, as a slow acting fluid pressure diaphragm motor 50 suitably supported adjacent the base of the device (see Figs. 1 and 2). This type of motor is well understood and need not be specifically described. Fluid under pressure is admitted through pipe 51. A reciprocable rod operated by the diaphragm is provided at 52, and 53 is a guide for the lower part of the rod. Pivotally connected with the projecting upper end of rod 52 are links 54 which are also connected with arm 21 at 55.

Upon pressure being admitted through pipe 51, rod 52 is moved upwardly, rocking arm 21, rotating shaft 20, rocking arm 23 with pin 24 downwardly. The segmental frame 26 moves downwardly therewith by gravity until its movement is stopped by stop 8ª. The arm 23 then continues to move downwardly until rod 52 has been projected to its uppermost limit. Then, as the rod 52 lowers, the diaphragm being weighted, as commonly done in such motors, arm 21 is pulled downwardly and arm 23 rocked upwardly. When pin 24 engages member 31, the frame 26 is also rocked upwardly. This upward movement of the frame 26 must be very slow in order that trip arm 43 on shaft 35 will not be rotated too rapidly, for reasons to be hereinafter described.

It is desired that the motor 50 shall operate once every few minutes, such as three or five minutes. For this purpose, we provide a bracket or other suitable supporting means 58 projecting laterally from plates 5 and 6 from a point near the top thereof. On this bracket is a valve chamber 59 to which fluid under pressure is delivered through pipe 60, and with which supply pipe 51 for motor 50 communicates through port 61 (see Figs. 1, 10 and 11).

Within the valve chamber 59 is a slidable valve member 62 adapted to be reciprocated across port 61 to establish and cut off the supply of fluid to motor 50 through pipe 51. In Fig. 10, the valve is shown in closed position, and in Fig. 11 it is shown in open position. The valve is reciprocated by a lever 63 passing through slot 64 over which the valve 62 forms an air tight seal. The lever 63 pivotally engages valve 62 at 65 and it is pivoted at 66. Its lower end is provided with a transverse pin 67.

Depending from bracket 58 is a suitable spring or other motor having a train of clock gears, which clock is indicated at 70. Projecting from the clock casing is a shaft 71 having a cross arm 71' thereon from which project pins 72 (see Figs. 2, 10 and 11, the cross arm being dotted in Figs. 10 and 11). Carried on a suitable support, such as bracket 73, are a pair of pivoted levers 74 and 75, both pivoting on a common pin 76. A spring, indicated at 77, tends to push lever 74 toward the left of the apparatus as shown in Figs. 10 and 11.

Pivoted near the upper end of lever 74 is a pivoted locking lever 78 having a shoulder 79 formed therein adapted to engage a pin 79' on bracket member 73. As shown in Fig. 10, the notch in lever 78 tends to hold lever 74 in the position shown against the action of spring 77. The pins 72 of cross arm 71' are so arranged that as the arm 71' is rotated by the clock train, they will lift lever 78 until the pin 79' is disengaged from the notch or shoulder 79, when spring 77 will force lever 74 to the position shown in Fig. 11. Pin 67 on lever 63 is so positioned that such movement of the lever 74 moves it a corresponding distance to rock lever 63 and open valve 62. On the lower part of lever 74 is an angularly extending foot or cam 74ª.

Lever 75 is urged in a direction opposite lever 74 by a spring 80. A latch lever 81 pivoted to bracket 73 at 82 is provided, this lever having a shoulder 83 formed therein for engagement with pin 84 on lever 75. At 85 is an angular foot on the lever 75.

The operation of the valve mechanism just described is as follows. The parts are normally in the position shown in Fig. 10, except that lever 75 is in the dotted instead of full line position. Pins 72 trip lever 78, causing lever 74 to be forced to the left by spring 77, opening valve 62. The parts will then be in the position shown in Fig. 11. Fluid under pressure can then pass from pipe 60 through the valve and through pipe 51 to the meter 50. As the motor raises arm 21, pin 22 on lever 21 engages foot or cam 74ª on lever 74 and returns the lever 74 to the position shown in Fig. 10 without moving lever 63. When the lever 74 has been moved to normal position, shoulder 79 on locking lever 78 will engage pin 79' to retain the lever in position. The pin 22 will continue to move upwardly past foot 74ª and trip lever 81, disengaging pin 84 from the shoulder 83, whereupon, spring 80 will move the lever to the full line position shown in Fig. 10. The upper end of lever 75 will engage pin 67 and rock lever 63 to close valve 62. The arm 21 will then be at the limit of its upward movement, as indicated in dotted lines in Fig. 10, and with the parts in the position shown in Fig. 10.

When valve 62 is closed, the arm 21 will begin to lower. As it lowers, pin 22 will ride past foot 74ª on lever 74, but foot or cam 85 will have been projected into the path of pin 22. The pin 22 will engage foot 85 and rock lever 75 back to the position shown in dotted lines in Fig. 10 and full lines in Fig. 11, and latch lever 81 will hold it in this position. The parts are then all automatically set for the next cycle of operation. Assuming that shaft 71 rotates a complete revolution every ten minutes, this cycle of operation will be effected once every five minutes.

In high pressure lines, the operating fluid for the motor may be supplied to branch pipe 60 from pipe 60ª, which communicates with the upstream side of the pipe line, as shown in Figs. 1 and 2.

Journalled in plate 6, but on the side of the device opposite shaft 20, is a shaft 90 which corresponds to shaft 20. This shaft with its attached parts is shown in detail in Fig. 9. The outwardly projecting end of the shaft 90 is journalled in a bracket 91 secured to the outer face of plate 6. Fixed to the inwardly projecting end of shaft 90 is a laterally extending arm 92 having a transverse pin 93 secured in the outer end thereof. The construction and arrangement of this arm is similar to the arm 21 on shaft 20.

Rotatable on shaft 90 is a frame 94 very similar in construction to frame 26. It is provided with a segmental rack at 95 and a serrated curved portion 96. Like frame 26, the frame moves between the guide bars 16 of the indicator and its downward movement is limited by stop $10^a$ of the differential gauge indicator 10. With reference to Fig. 2, the indicator is at zero when it is moved as far as possible to the left. The curve of portion 96 is so plotted with reference to the stop $10^a$ and to the gear rack 95, that when the indicator stop $10^a$ is at zero, the frame may not rock downwardly by reason of curved portion 96 contacting with the stop. The frame 94 may be rocked downwardly an increasing distance with a rise in the differential pressure. Fixed to the shaft 90 is an arm 97 having a pin 98 therein adapted to engage the under part of the frame 94. When the shaft 90 is rotated by lever 92, arm 97 rocks in the opposite direction. When arm 92 is raised, arm 97 rocks downwardly. By reason of the frame 94 being rotatable about shaft 90, the weight of supporting the frame to prevent it from moving downwardly rests on pin 98. When, therefore, arm 97 rocks downwardly, the frame moves downwardly therewith until the curved portion 96 engages stop $10^a$ when the arm 97 may continue to move downwardly without further movement of the frame 94. Upon the arm 97 rising to normal position, pin 98 will engage the under side of the frame 94 and lift it also to normal position.

Figure 6:
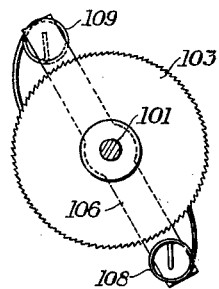
Fig. 6 is a detail view of a portion of the gearing shown in Fig. 5, the view being a sectional view on line VI—VI of Fig. 5.
Figure 5:
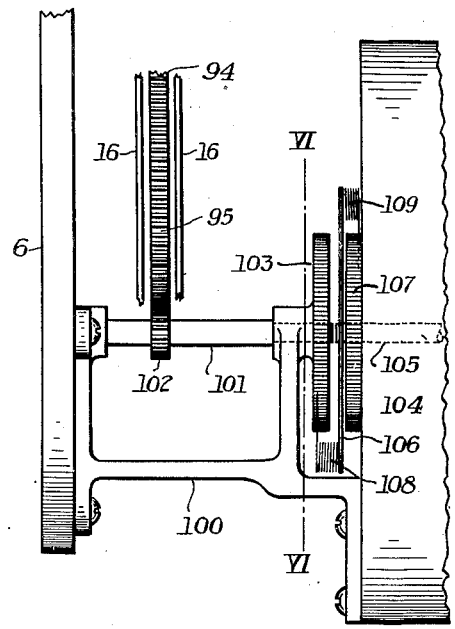
Fig. 5 is a plan view of the gearing for driving the registering device.

Secured to plate 6 is a suitable frame or bracket 100 (see Fig. 5) providing bearings for a shaft 101 on which is a pinion 102 having a definite number of teeth, which pinion meshes with the teeth on rack 95 of the frame 94. On the outer end of shaft 101 is fixed a ratchet wheel 103 (see Figs. 5 and 6). Supported on bracket 100, is a registering or metering device 104 of any known or suitable construction. The train of gears in the registering device must bear a certain relation to the number of teeth on pinion 102, this relation depending on the known co-efficient of the orifice meter B. Shaft 105 is the driving shaft from which the various indicators are driven. This shaft projects outside of the casing and on its end is a cross arm 106. At 107 is a ratchet wheel which is fixed to the meter casing.

On one end of the cross arm 106 is a spring pawl 108 engaging ratchet wheel 103, and on the opposite end is a similar pawl 109 engaging fixed ratchet wheel 107. The arrangement is such that when shaft 101 is rotated by the downward movement of segmental rack 95, shaft 105 will be held against rotation by pawl 109 and ratchet 107, but when shaft 101 is rotated in the opposite direction by the upward movement of the rack 95, the rotation will be transmitted to shaft 105 through cross arm 106 and pawl 108. Thus, it will be seen that the registering device will be operated proportionately to the downward movement of frame 94, which in turn is limited by the differential pressure.

The relation of the teeth on pinion 102 to the teeth on rack 95, and the curvature of portion 96 relatively to the indicator, is such that the rotation imparted to shaft 101 and to shaft 105 is proportionate to the square root of the differential pressure in inches (of water). Thus, if the differential pressure is one inch, indicator stop $10^a$ will move a sufficient distance to permit the frame 94 to be rocked downwardly sufficiently far that when it returns to normal position, shaft 101 will be rotated through pinion 102, we will assume, one complete revolution. When the differential pressure is twenty-five inches, the shaft 101 would be rotated five complete revolutions. By doubling the number of teeth of pinion 102, it would be possible to rotate shaft 101 only half as many times and still maintain the proper proportional movement. It is desirable and essential that the shaft 101 be rotated, however, proportionately to the square of the differential pressure. The relation of the train of gears in the registering device, of course, depends on the number of times shaft 101 is geared to be rotated for a definite increase in pressure.

For oscillating or rocking the frame 94, we preferably employ means very similar to that used for rocking frame 26. This mechanism, as shown, comprises a diaphragm motor 110 suitably supported near the base of the device. Fluid under pressure is supplied through pipe 111 and 112 is a rod reciprocated by the motor, 113 being a guide for the lower part of the rod. Links 114 pivotally connected with the projecting upper end of the rod 112 and with arm 92 on shaft 90 serve to transmit the reciprocable movement of the rod 112 to the arm 97 to effect the operation of the frame 94. Motor 110 differs from motor 50 only in that the former is very quick acting, while the latter, as before stated, is slow acting.

According to our invention, it is desired that motor 110 operate once for every complete revolution of trip lever 43 on shaft 35, that is, that the operation of the second motor be proportionate to the static pressure in atmospheres. For this purpose, we provide a bracket 115 extending from the side of plates 5 and 6 and similar to bracket 58. On bracket 115 is provided a valve chamber 116 (see Figs. 12 and 13), in which is a slide valve 117. The slide valve is adapted to cover and uncover port 118 leading to pipe 111 which communicates with the motor 110. A fluid pressure supply pipe 119 communicates with the interior of the chamber 116, and may be connected with the main supply line 60ª at 60ᵇ (see Figs. 1 and 2). In Fig. 12, the valve is shown in closed position, and in Fig. 13 it is open. The valve is reciprocated by means of a lever 120 pivoted at 121 and having one end thereof pivotally engaging the valve 117 at 122 through a slot 123 over which the valve forms an air tight seal. The lower end of lever 120 carries a transversely extending pin 124.

For rocking lever 120 to shift the position of the valve 117, we provide levers 125 and 126 pivoted on pin 127. Lever 125 has an angular foot 125ª and lever 126 has an angular foot 126ª. Pivoted at 128 on lever 125 is a tripping lever 129 having a small weight 130 on one end thereof and having its other end extending into the path of travel of tripper arm 43. A shoulder 129′ on lever 129 is adapted to normally engage a fixed pin 131 on the supporting bracket. Referring to Figs. 12 and 13, a spring 132 is provided for urging lever 125 from the position shown in Fig. 12 to the right to the position shown in Fig. 13. On lever 126 is a pin 133 and a locking lever 135 pivoted at 131 and having a shoulder 136 for engagement with the pin is provided. The full line position of lever 126 in Fig. 13 is the normal position of the lever and corresponds to the dotted line position in Fig. 12. This lever is urged to the left by a spring, such as 137.

The operation is as follows. When tripper arm 43 is rotated, pin 44 thereon engages the end of trip lever 129, depressing it, the parts before such depressing action being in the position shown in Fig. 12, with the exception that lever 126 is in the dotted line position. When the end of lever 129 is rocked downwardly, shoulder 129′ is moved upwardly, disengaging pin 131. Spring 132 then acts to move lever 125 to the position shown in Fig. 13. The upper end of lever 125 engages pin 124 on valve actuating lever 120, thereby shifting the valve to the open position. During this time, lever 126 is stationary.

Upon opening of valve 117 to uncover port 118, motor 110 is actuated, moving lever 92 upwardly and lowering lever 97 in order to permit frame 94 to rock downwardly. Upon the frame 94 reaching the limit allowed by stop 10ª, pin 98 disengages from contact with the frame 94, and continues to move downward. Cross pin 93 on its upward movement engages foot 125ª and thereby rocks lever 125 back to the position shown in Fig. 12, where weight 130 moves the lever so that shoulder 129′ engages pin 131. Lever 120, however, does not move with this movement of lever 125, and arm 92 continues to move upwardly until cross pin 93 lifts the end of locking lever 135 when spring 137 forces the lever 126 to the full line position shown in Fig. 12. The upper end of this lever, in so moving, engages pin 124 on lever 120 and thereby rocks the lever 120 to close the valve 117. Then the fluid pressure is cut off from motor 110 and arm 92 is moved rapidly downward. In moving downward, cross pin 93 engages foot or cam 126ª and rocks lever 126 to the right, until shoulder 136 on lock lever 135 engages pin 133 to hold lever 126 in normal position. The parts are all set then, for the next cycle of operation. The complete cycle of operation is completed before tripper arm 43 has rotated another complete revolution, so that a cycle of operation occurs for every revolution of trip arm 43 and shaft 35.

In order that the device may be substantially automatic, and may, if necessary, be run for long periods without winding the clock, we may provide an automatic clock winding mechanism, such for instance as that shown in detail in Fig. 9ª. The ordinary winding stem or shaft 140 of the clock 70 extends outwardly and fixed on the end of the shaft is a ratchet wheel 141. Rotatable about shaft 140 and between the wheel 141 and the casing of the clock is a curved arm 142 having a projecting end 143. Pivoted on arm 142 is a pawl 144 which engages ratchet wheel 141. At 145 is an adjustable pin with which the projecting end 143 of the arm 142 is adapted to contact to limit the downward movement or swing of the arm. On the opposite end of arm 142 is a pivoted lever 146, and a pin 147 permits the lever 146 to be rocked in one direction only. The end of lever 146 projects into the path of travel of pin 22 on arm 21. As pin 22 moves upwardly, it engages the projecting end of the lever 146, which is held from rocking by pin 147, so that arm 142 is rocked upwardly, and pawl 144, engages ratchet wheel 141 to wind the clock. The arm 142 may drop by gravity when pin 22 lowers until end 143 engages pin 145. Lever 146 provides a dog to permit pin 22 to rock downwardly if arm 142 is raised so high that it drops before pin 22 moves downwardly. By proper adjustment of pin 145, the proper amount of movement of arm 142 may be obtained.

From the foregoing, it is believed that the operation of the invention may be understood. The first motor 50 is actuated periodically by the clock to rock frame 26 a distance proportional to the square root of the static pressure in atmospheres. This, in turn, causes the rotation of trip arm 43 a proportionate distance. Trip arm 43 in turn effects the operation of motor 110 to cause frame 94 to be rocked a distance proportional to the square of the differential pressure in inches for each complete rotation of the trip arm 43. Such rocking of the frame 94 drives register shaft 105 a known number of revolutions, and the indicators on the dials of the register are accordingly moved to register a certain amount. The units registered by the regulating device are of constant value.

The operation may be understood more clearly by a specific example. Assume that the orifice will pass 100 cubic feet of gas at a pressure of 4 ounces in five minutes. This then is the constant of the orifice meter. Assume that the average static pressure for a given five minutes is about three atmospheres gauge pressure, or four atmospheres absolute pressure. Assume that the average differential pressure for the same period is 25 inches. Accordingly, the formula, $$Q = C\sqrt{hp},$$

in the example given, would be $$Q = 100\sqrt{25 \times 4}$$

or $$Q = 100 \times 5 \times 2$$

or $$Q = 1000.$$

Working the formula out this way, we find that in the example given, the equivalent of one thousand cubic feet at 4 ounces pressure passed through the orifice in the five minutes (4 ounces being the pressure at which the gas is to be used or sold).

The present invention eliminates such calculation. With the same example in mind, assume that one revolution of shaft 105 will register 100 cubic feet on the dial of the registering device, and that shaft 101 will be rotated once for every increase of one in the value of the square root of the differential pressure; that is, that shaft 101 (and consequently shaft 105) will rotate five complete revolutions when the differential pressure is twenty-five inches—five being the square root of twenty-five.

Under the circumstances assumed, at the end of a given five minutes, with the static pressure stop 8ª moved to a position to indicate three atmospheres gauge pressure (4 atmospheres absolute pressure) and the differential pressure stop moved to indicate twenty-five inches, the operation will be as follows: Motor 110 will be operated when the valve is opened by the clock work and frame 26 will be rocked until it is stopped by stop 8ª. The square root of four is two, so frame 26 will be lowered a sufficient distance to rotate shaft 25 two revolutions when the frame is lifted. When the motor has raised arm 21 to its limit and shut off the pressure supply, arm 21 will begin to lower slowly and frame 26, by engagement with pin 24 on arm 23, will be slowly lifted. Shaft 35 will be rotated slowly, actuating the trip mechanism to cause motor 110 to operate. Frame 94 will then be rocked downwardly until stop 10ª, indicating twenty-five inches of pressure, prevents further downward movement. When the frame is rocked back, shaft 105 will be rotated five times, and the registering device will register five hundred cubic feet. By this time, frame 26 will have moved sufficiently far to have rotated trip arm 43 a second time, and motor 110 will actuate again to cause shaft 105 to be rotated another five times, thus moving the dial to indicate 1000 cubic feet, which is the result obtained by use of the formula. At the end of the next five minutes, the operation would be repeated. If there has been a change in pressure in the line, the pressure controlled stops 8ª and 10ª will be moved accordingly, and the amount registered would automatically vary. Thus, the average amount passing through the line every five minutes may be obtained and registered.

As before explained, frame 26 will be rocked sufficiently to rotate the trip arm once even though the static pressure gauge is at zero. It therefore automatically accounts for the difference of one atmosphere between gauge pressure and absolute pressure. If there were no differential pressure, there would accordingly be no flow of gas, and the frame 94 would not be rocked even though motor 110 would actuate once.

While we have shown one embodiment of our invention, we do not limit ourselves to this construction, as many changes may be made therein and various forms of motors and controlling devices could be used. The operation of the device would be similar if a Pitot tube or other fluid meter of this general character were used instead of an orifice meter, and it is intended that the term "differential pressure" as included in the specification and claims be interpreted to include dynamic pressure, the differential and the dynamic pressure both being proportionate to the velocity of the fluid.

The construction described is illustrative of our invention, and what we claim is:

1. The combination with a fluid meter, of a registering mechanism, means for effecting the actuation of the registering mechanism at fixed constant periods of time, and a movable pressure actuated means for controlling the operation of the registering mechanism proportionately to the position to which the pressure actuated means is moved.

2. The combination with a pipe through which fluid may be passed having a meter therein, of a registering mechanism adapted to register the flow of fluid therethrough in units of constant value, means for intermittently effecting the actuation of the registering mechanism at regular intervals of time, and a movable pressure actuated means, the actuation of which is proportional to the velocity of the fluid in the pipe, and means whereby the position of the movable pressure actuated means limits the movement of the registering mechanism.

3. The combination with a fluid meter, of a device responsive to variations in the velocity or pressure of the fluid passing through the meter for registering at fixed periods of time the average flow of fluid through the meter in units of constant value for each period of operation.

4. The combination with a fluid meter, of means for registering the flow of fluid through the meter in units of a fixed value, said means operating at regular fixed periods in accordance with a fixed constant value for the meter, said registering means being actuated by static and differential pressure controlled devices.

5. The combination with a pipe line and fluid meter having a known constant for a given period, of a registering means, and intermittently operated means actuated at regular periods for actuating said registering means, said intermittently operated means being controlled by the static pressure in the pipe line and by the differential or dynamic pressure.

6. The combination with a fluid meter, of a registering device, an intermittently operated means driven at regular fixed intervals for actuating the registering device proportionally to the static pressure on one side of the fluid meter and to the differential pressure on opposite sides thereof.

7. A registering device for fluid meters including a mechanism whose movement is limited by static pressure in a pipe line, a mechanism whose movement is limited proportionally to the velocity of fluid in a pipe line, means for driving the first mentioned mechanism periodically, means for driving the second mechanism proportionally to the movement of the first mechanism, and means for indicating the result of the combined movement of the two mechanisms.

8. A registering device for fluid meters including a train of gears whose movement is limited by static pressure, a second train of gears whose movement is limited by differential pressure, means for driving one train of gears periodically, means for driving the other train of gears proportionally to the movement of the first train of gears, and means for indicating the result of the combined movement of the two trains.

9. The combination with a pipe line for fluids having a fluid meter therein, of a registering device for the meter which includes a mechanism whose movement is limited by static pressure in the line, a mechanism whose movement is limited proportionally to the velocity of the fluid in the pipe line, means for driving the first mentioned mechanism periodically, means for driving the second mechanism proportionally to the movement of the first mechanism, and means for indicating the result of the combined movements of the two mechanisms, said means for operating the mechanisms being actuated by the fluid in the pipe line.

10. A registering device for fluid meters including a train of gears whose movement is limited by static pressure, a train of gears whose movement is limited by differential pressure, means for driving one train of gears periodically, means for driving the other train of gears proportionally to the movement of the first train of gears, and a registering device driven by the second train of gears.

11. The combination with a fluid meter, of a device adapted to measure the flow of fluid therethrough in units of a fixed value including a static pressure operated means, a differential pressure operated means, gearing whose movement is proportional to the square root of the static pressure, gearing whose movement is proportional to the square root of the differential pressure, means whereby one set of gearing will be operated periodically, means whereby the other set of gearing will be controlled by the movement of the first set, and a registering device driven by the second set.

12. The combination with a fluid meter, of a device adapted to measure the flow of fluid therethrough in units of a definite value, said means including a static pressure operated device, a differential pressure operated device, gearing whose movement is proportional to the square root of the static pressure, gearing whose movement is proportional to the differential pressure, time controlled mechanism for operating one train of gearing, a rotating member driven by the time controlled gearing, and means controlled by the rotating member for actuating the second train of gearing in proportion to the number of revolutions the rotating member is driven, and a registering device actuated by this set of gearing.

13. The combination with a fluid meter, of a device adapted to measure the flow of fluid therethrough in units of a definite value, said means including a static pressure operated device, a differential pressure operated device, gearing whose movement is proportional to the square root of the static pressure, gearing whose movement is proportional to the square root of the differential pressure, time controlled mechanism for operating the static pressure controlled train of gearing, a rotating member driven by the static pressure controlled train of gearing, means controlled by the rotating member for operating the differential pressure controlled gearing, and a registering device driven by said differential pressure controlled gearing.

14. The combination with a fluid meter, of a device for registering the flow of fluid therethrough in units of a fixed value, said means including a static pressure controlled stop, a differential pressure controlled stop, gearing whose movement is limited by the static pressure controlled stop, gearing whose movement is limited by the differential pressure controlled stop, a motor for driving said train of gearing, time controlled mechanism for controlling the motor for one train, means controlled by the movement of that train for controlling the actuation of the other train of gearing, and a registering device operated by said second train of gearing.

15. The combination with a fluid meter, of a device for registering the flow of fluid therethrough in units of a fixed value, said means including a static pressure controlled stop, a differential pressure controlled stop, gearing whose movement is limited by the static pressure controlled stop, gearing whose movement is limited by the differential pressure controlled stop, a fluid pressure motor for driving such train of gearing, time controlled mechanism for controlling the motor for one train, means controlled by the movement of that train for controlling the actuation of the other train of gearing, automatic valve actuating mechanism for each of the motors, and a registering device operated by said second train of gearing.

16. An integrating device comprising a support, a pivoted frame adapted to be rocked, gearing driven by the movement of the frame, a curved stop engaging means on the frame, a pressure controlled stop, the curved stop engaging portions of said frame being so positioned with relation to the stop that the distance it rocks will be proportionate to the square root of the pressure, and means for rocking the frame.

17. An integrating and registering device comprising a support, a frame pivotally mounted on the support and capable of being rocked, a second frame similarly mounted on the support, time controlled means for rocking the first frame, a pressure actuated stop for limiting the movement of the first frame proportionally to the pressure which actuates said stop, a rotatable member driven by the movement of the first frame, means controlled by said rotatable member for rocking the second frame, a second pressure controlled stop for limiting the movement of the second frame proportionally to the pressure which actuates the stop, and a registering device driven by the movement of the second frame.

18. The combination with a pipe line, of means for registering in units of a fixed value the flow of fluid through said pipe, said means including a stop moved in accordance with the static pressure in the pipe, a second stop moved in accordance with the velocity of the fluid passing through the pipe, a register, and gearing for driving a register, said gearing including externally driven members whose motion in one direction is limited by contact with said stops.

19. The combination with a pipe line, of means for registering in units of a fixed value the flow of fluid through said pipe, said means including a stop moved in accordance with the static pressure in the pipe, a second stop independent of the first stop moved in accordance with the velocity of the fluid passing through the pipe, a register, and gearing for driving the register, said gearing including two externally driven members, one of which is controlled by the other and each of which is limited in its movement by contact with one of the stops.

In testimony whereof, we affix our signatures in presence of two witnesses.

JAMES R. ARMSTRONG.
THOMAS B. WYLIE.

Witnesses:
Lois Wineman,
Wm. H. Parmelee.